United States Patent
Rath et al.

(10) Patent No.: US 11,693,580 B2
(45) Date of Patent: Jul. 4, 2023

(54) METHOD TO PROVIDE RECOMMENDATIONS FOR CLOUD STORAGE PROVIDERS AND STORAGE CLASSES BASED ON BACKUP SERVER'S USAGE PATTERNS FOR LOWERING OVERALL CLOUD COSTS

(71) Applicant: EMC IP Holding Company LLC, Hopkinton, MA (US)

(72) Inventors: Jagannathdas Rath, Bengaluru (IN); Kalyan C Gunda, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 30 days.

(21) Appl. No.: 17/337,975

(22) Filed: Jun. 3, 2021

(65) Prior Publication Data
US 2022/0391097 A1    Dec. 8, 2022

(51) Int. Cl.
*G06F 3/06* (2006.01)
*G06Q 30/0283* (2023.01)
*G06F 7/08* (2006.01)

(52) U.S. Cl.
CPC .............. *G06F 3/065* (2013.01); *G06F 3/067* (2013.01); *G06F 3/0619* (2013.01); *G06F 3/0653* (2013.01); *G06F 7/08* (2013.01); *G06Q 30/0283* (2013.01)

(58) Field of Classification Search
CPC ...... G06F 3/065; G06F 3/0619; G06F 3/0653; G06F 3/067; G06F 7/08; G06Q 30/0283
See application file for complete search history.

(56) References Cited

U.S. PATENT DOCUMENTS

| | | | |
|---|---|---|---|
| 10,521,124 B1 * | 12/2019 | Aharoni | G06F 3/0631 |
| 10,768,848 B2 * | 9/2020 | Wigmore | G06F 11/1469 |
| 11,048,591 B1 * | 6/2021 | Mamidi | G06F 16/2246 |
| 2012/0117029 A1 * | 5/2012 | Gold | G06F 11/1469 |
| | | | 707/651 |

* cited by examiner

*Primary Examiner* — Hiep T Nguyen
(74) *Attorney, Agent, or Firm* — Womble Bond Dickinson (US) LLP (57) ABSTRACT

A method, apparatus, and system determines an optimal storage configuration of storing backup data. The method may include receiving a request from a client device for determining an optimal storage configuration for storing backup data of a client. The method may include determining a cloud utilization pattern of the backup data based on prior access activities and determining a first suitability score for the first storage class based on the cloud utilization pattern. The method may include, for each of the storage classes of the first storage provider, determining a suitability score for the corresponding storage class if the backup data were stored in the corresponding storage class. The method may include transmitting to the client device a recommendation of a second storage class of the first storage provider having a suitability score higher than the first suitability score based on the suitability score to reduce cloud resources usage.

20 Claims, 8 Drawing Sheets

METHOD TO PROVIDE RECOMMENDATIONS FOR CLOUD STORAGE PROVIDERS AND STORAGE CLASSES BASED ON BACKUP SERVER'S USAGE PATTERNS FOR LOWERING OVERALL CLOUD COSTS

FIELD OF THE INVENTION

Embodiments of the present invention relate generally to backup applications. More particularly, embodiments of the invention relate to a method to provide recommendations for cloud storage providers and storage classes based on the backup server usage patterns.

BACKGROUND

As cloud technology is becoming more accessible, cloud storage ("cloud tier") has become a common practice for direct backup applications, deduplication (dedupe) and non-deduplication (non-dedupe), to store data off-premise for long term retention purposes. In a dedupe backup system, a file is split into segments and these segments are deduped across all files in the system. These unique segments are packed into containers and then loaded to a cloud as objects varying around few Megabytes (MBs) in size. Whereas in non-dedupe backup systems, the files may be directly moved as a whole unit of data to a cloud or split into multiple objects/chunks and then moved to the cloud. The movement of these data to the cloud is generally governed by various policies that can be configured in the backup servers. For example, "move all files older than two weeks to cloud."

With various storage classes of a cloud storage to choose from, it can be very challenging to identify accurately which class is best for their backup server. Each storage class may have its own Service Level Agreement (SLA) and cost slab. Once a particular cloud storage class is configured in the backup server, cost comparisons with other storage classes or storage providers may not be available at any time after the configuration. In addition, existing backup servers do not offer analytical and cost insight report that can provide optimal storage configuration of storing backup data. Thus, there is a need for systems and methods for a backup server to provide recommendations for cloud storage providers and storage classes based on the backup server usage patterns.

BRIEF DESCRIPTION OF THE DRAWINGS

Embodiments of the invention are illustrated by way of example and not a limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to a method, apparatus, and system for determining an optimal storage configuration of storing backup data. The embodiments of the present disclosure provide a method to determine the backup server cloud usage patterns over time and provide approximate cost, usage insights, and recommendations for a configured cloud provider and storage class. The method may provide insight and a recommendation enabling the customers to switch to an optimal storage class or storage provider.

According to some embodiments, backup server may receive a request from a client device for determining an optimal storage configuration for storing backup data of a client. The backup data may be currently stored in a first storage class of a first storage provider that provides storage classes of storage. The backup server may determine a cloud utilization pattern of the backup data based on prior access activities. The backup server may determine a first suitability score for the first storage class based on the cloud utilization pattern. For each of the storage classes of the first storage provider, the backup server may determine a suitability score for the corresponding storage class if the backup data were stored in the corresponding storage class. Thereafter, the backup server may transmit to the client device a recommendation of a second storage class of the first storage provider having a suitability score higher than the first suitability score based on the suitability score to reduce cloud resources usage.

In one embodiment, the first storage provider is one of storage providers and each of the storage providers provides storage classes of storage. For each of the storage providers and for each of the storage classes of the storage provider, the backup server may calculate a suitability score for the corresponding storage class of the corresponding storage provider if the backup data were stored therein. The backup server may rank each combination of the storage classes of the storage providers based on its suitability score. The backup server may transmit to the client device, the ranking of the combinations of the storage classes of the storage providers.

In a particular embodiment, the backup server may recommend a combination of a storage class of one of the storage providers that has a highest suitability score.

In one embodiment, in determining the first suitability score for the first cloud provider and the first storage class, the backup server may determine the first storage class. The Backup server may compare the first suitability score for the first storage class of the first cloud provider with the suitability score of each of the storage classes of the first storage provider. The backup server may compare the first suitability score for the first storage class with the suitability score of each of the plurality of the storage classes of the storage providers.

In one embodiment, in determining the first suitability score for the first cloud provider and the first storage class, the backup server may determine whether the cloud utilization pattern is within a predetermined range of the first suitability score of the first storage class. The backup server may identify the storage classes including the first and second storage classes based on how frequently backup data are accessed or modified. The storage classes may include frequently accessed class, infrequently accessed class, and archival class. The backup server may determine an amount of backup data access performed over time by a backup server. The backup server may store the plurality of storage classes in a local storage.

In one embodiment, the backup server may update accounting statistics for a cloud operation in a data structure. The backup server may store the accounting statistics for the performed cloud operation for each of the storage classes and each of the cloud providers.

In one embodiment, the backup server may fetch metrics of cloud operations. The backup server may calculate total costs for the cloud operations based on the metrics of cloud operations. The backup server may record the total costs in a data structure on a local storage. The backup server may sort the data structure using a sorting algorithm. The backup server may display the data structure. A top row of the data structure may indicate the suitable cloud provider and storage class for the optimal storage configuration of storing backup data.

In one embodiment, the backup server may fetch an amount associated with operations performed in a configured storage class. The backup server may calculate a utilization percentage based on the amount associated with the operations performed in the configured storage class. The backup server may compare the utilization percentage with storage class thresholds for each storage class.

In one embodiment, the backup server may determine whether the utilization percentage satisfies one of the storage classes to which the configured storage class belongs to. The backup server may recommend the suitable storage class. The backup server may display the suitable storage class and a mapping of the suitable storage class for each of the storage providers corresponding to the suitable storage class.

Embodiments of the present disclosure propose a solution for determining potential cost savings, if any of the other remaining classes had been used or even if storage classes from other cloud providers had been used. According to this solution, optimal cloud provider and class can be recommended based on the usage patterns of the backup server if the configured cloud provider and class is not suitable. The solution may recommend a storage class or type based on the cost incurred by the backups and the present usage or pattern in the backup server. Additionally, the solution may provide a recommendation for future backups using analytics. The solution may also determine an approximate cost for various cloud operations accumulated in the backup server. The solution may determine an approximate cost for various other storage classes or tiers for the same cloud provider and then may display the first recommendation based on the lowest cost. In this manner, the customers can identify if they are using non-optimal provider or storage class with respect to costs. In addition, the solution provides access-based-insight recommendations for different types of storage classes (standard, less frequently, archival, staging, etc.) based on the access and usage pattern of the backup server. Accordingly, the customers can identify if the selected storage class is not an optimal storage class based on the usage pattern in the backup server. The solution can detect the cloud access patterns and provide recommendations for the optimal storage class. Accordingly, the method may recommend to switch to less frequently accessed class when the data are less accessed/modified. Similarly, the method may recommend to switch to the archival class when the data are rarely or never accessed/modified. The method can also consider different other cloud providers and the associated classes while generating a comparative analysis and recommendation. In this manner, customers may have options to switch to different cloud providers.

In another aspect of the disclosure, embodiments of the present disclosure also provide a non-transitory machine-readable medium and a data processing system perform the processes as described above.

Figure 1A:
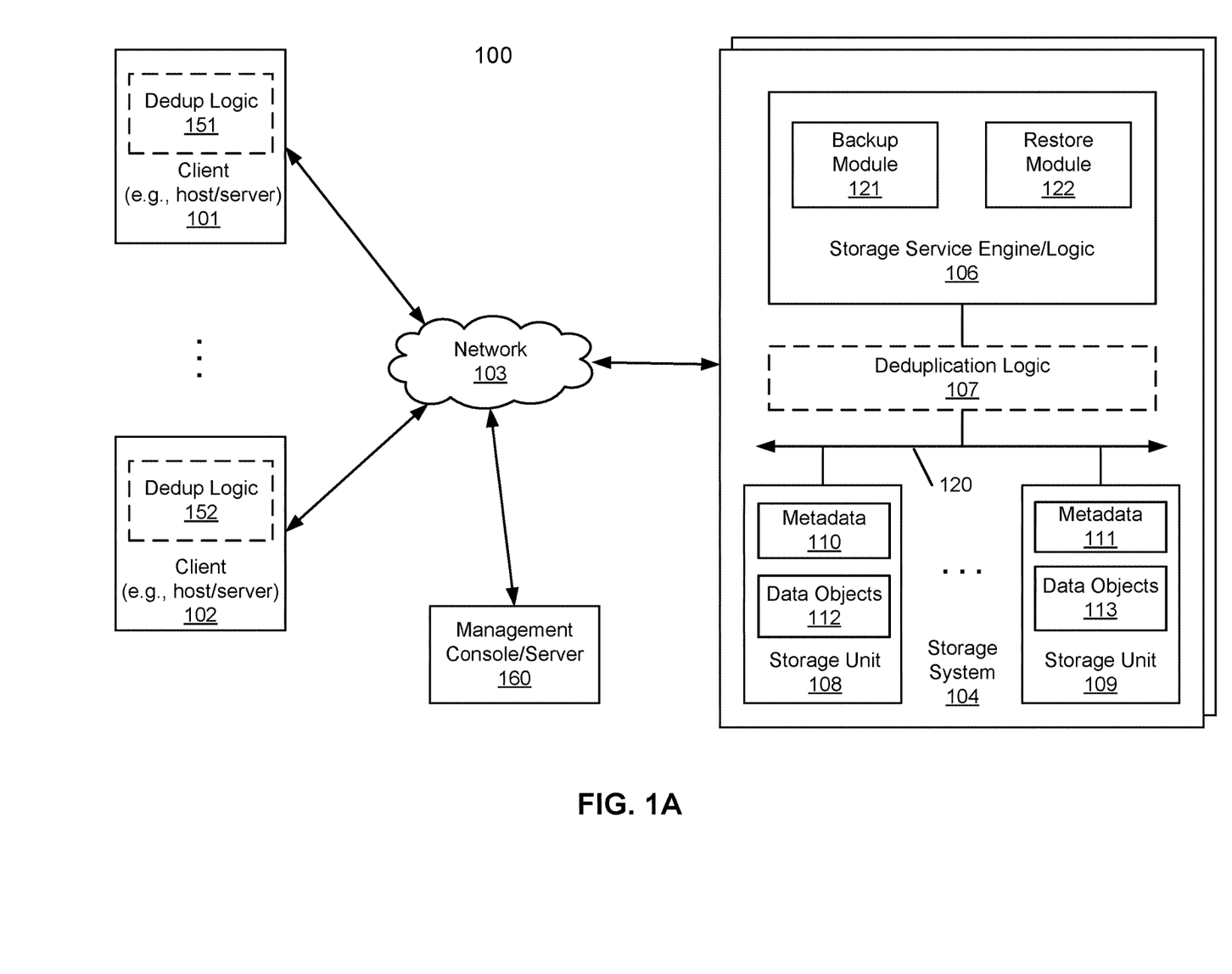
FIG. 1A is a block diagram illustrating a storage system according to one embodiment.

FIG. 1A is a block diagram illustrating a storage system according to one embodiment of the invention. Referring to FIG. 1A, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., backup servers or cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 1B:
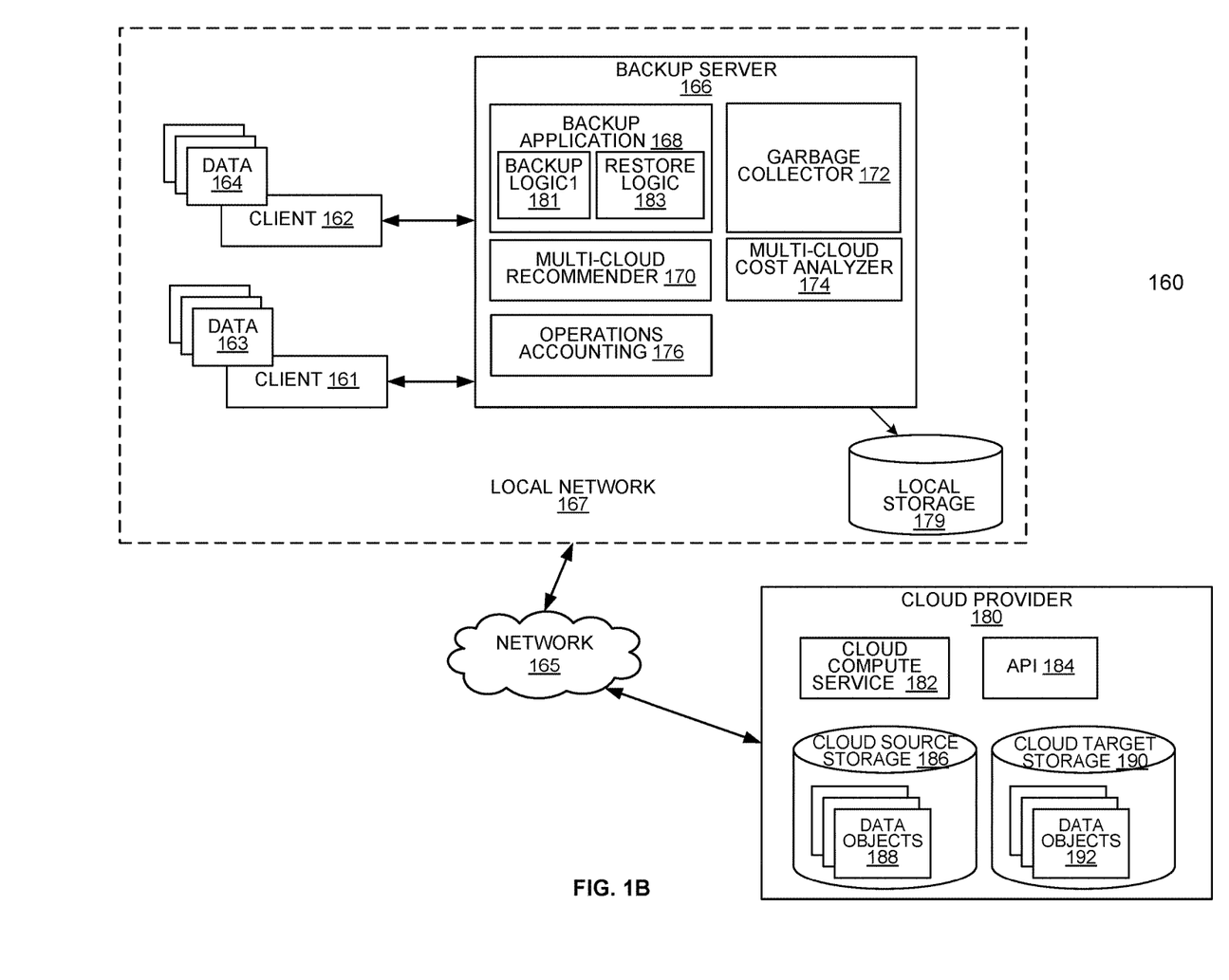
FIG. 1B is a block diagram illustrating an example environment in which embodiments of the disclosure may be practiced.

FIG. 1B is a block diagram illustrating an example of a networked environment 160 in which embodiments of the disclosure may be practiced is shown. Referring to FIG. 1B, the networked environment 160 may include, but is not limited to, a plurality of clients 161-162, a backup server 166, a network 165, a local network 167, and a cloud provider 180. The plurality of clients 161-162 having data 163 and 164 stored therein, respectively, may be any type of client such as a host or server, a personal computer (e.g., desktops, laptops, and tablets), a "thin" client, a personal digital assistant (PDA), a Web enabled appliance, or a mobile phone (e.g., Smartphone), etc. Alternatively, any of the plurality of clients 161-162 may be a primary storage system (e.g., local data center) that provides storage to other local clients, which may periodically back up the content stored therein to a backup storage system (e.g., a disaster recovery site or system), such as a local storage 179. Local network 167 and network 165 may be any type of networks such as a local area network (LAN), a wide area network (WAN) such as the Internet, a fiber network, a storage network, or a combination thereof, wired or wireless. The plurality of clients 161-162 may be in physical proximity or may be physically remote from one another. The local storage 179 may be located in proximity to one, both, or neither of clients 161-162. Therefore, the client 161-162 may be a backup client of the backup server 166. Client 161-162, the backup server 166, and local storage 179 may be communicatively connected to one another via the local network 167. Client 161-162, the backup server 166, and local storage 179 may be communicatively connected to the cloud provider via the network 165.

The backup server 166 may represent the storage system 104 (FIG. 1A) and include, but may not be limited to, backup application 168, multi-cloud recommender 170, garbage collector 172, multi-cloud cost analyzer 174, and operations accounting 176. The backup server 166 utilizes one or more cloud storages to move data regularly for long term retention. The backup server 166 performs a variety of cloud operations, for example, moving new data to the cloud, reading existing cloud data, performing garbage collection-based cleanups, deleting cloud data, obtaining objects metadata only, listing objects, performing batch jobs, etc.

In one embodiment, backup application 168 may be separate from the backup server 166. For example, backup application 168 may include backup logic 181 and restore logic 183. Backup logic 181 is configured to receive and backup data from a client (e.g., clients 161-162) and to store the backup data in the local storage 179. Restore logic 183 is configured to retrieve and restore backup data from the local storage 179 back to a client (e.g., clients 161-162). The backup server 166 may back up data stored on the local storage 179. The local storage 179 may be a part of the backup server 166 or separate from the backup server 166. The backup server 166 may initiate backup operations in response to requests from the clients 161-162. The backup application 168 can also be an independent system outside of the backup server 166 and can coordinate a backup operation between clients 161 and 162 and the backup server 166. In one embodiment, a client 162, for example, may transmit a request for a backup process for data 164 (e.g., a set of files) to the backup application 168. After receiving the request from the client 162, the backup application 168 may initiate a backup operation of data 164 and the data 164 is copied to the local storage 179 from the client 162. The backup server 166, may then initiate data movement of the data stored in the local storage 179 to the cloud source storage 186 based on various defined data movement policies.

The local storage 179 may be implemented locally (e.g., single node operating environment) or remotely (e.g., multi-node operating environment) via interconnect (not shown), which may be a bus and/or a network (e.g., a storage network or a network similar to local network 167). The local storage 179 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. The local storage 179 may be located locally or be remotely accessible over a network. According to one embodiment, the garbage collector 172 may be configured to perform garbage collection (GC) process.

The cloud provider 180 may include cloud compute service 182, API 184, cloud source storage 186 storing data objects 188, and cloud target storage 190 storing data objects 192. Although one cloud provider 180 is shown, more than one cloud provider can be supported in this network environment 160. The cloud source storage 186 may represent a primary cloud storage region and the target storage may represent a secondary cloud storage region. Data objects 192 stored in the cloud target storage 190 may represent replicated data of the data objects 188 stored in the cloud source storage 186. Backup application initially writes data to the cloud source storage 186. The cloud provider may replicate the data objects 188 stored in the cloud source storage 186 to the target storage 190. In one embodiment, for example, the cloud provider 180 can be deployed in a cloud environment as a server of a cloud service provider. The cloud provider 180 provides cloud services over a network that is open for public use, such as the Internet. The cloud provider 180 may be a public cloud service provider such as Amazon Web Services® (AWS), Microsoft Azure®), IBM Cloud, or Google Cloud Platform (GCP). In another embodiment, the cloud provider 180 may be a private cloud that is located at a client's premise. In some embodiments, various operations of the cloud source storage 186 and the cloud target storage 190 on the cloud provider 180 may be managed by a cloud compute service 182. The cloud source storage 186 and the cloud target storage 190 may be hosted on one or more data centers including any number of storage devices as will be appreciated by one ordinarily skilled in the art. The cloud source storage 186 and the cloud target storage 190 may be geographically spread out over several physical locations. The cloud provider 180 may include or represent any type of servers or a cluster of one or more servers (e.g., cloud servers). For example, cloud provider 180 may be a storage server used for various different purposes, such as to provide multiple users or client systems with access to shared data and/or to back up (or restore) data (e.g., mission critical data). The cloud provider 180 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fiber channel (FC) protocol, etc. The cloud provider 180 may further provide storage services via an object-based protocol like S3, Hadoop distributed file system (HDFS) protocol, or the like.

In one embodiment, cloud compute service 182 (also referred to as service logic, service module, or service unit), may be implemented in software, hardware, or a combination thereof. Cloud compute service 182 may also represent any storage service related components configured or adapted to provide storage services (e.g., storage as a service) to a variety of clients using any of the access protocols set forth above.

The cloud compute service 182 of the cloud provider 180 may receive the request for data movement process from the backup server 166. During the backup operations, the backup server 166 may retrieve data that is to be backed up from the local storage 179 and may transfer the data to the cloud source storage 186 in the cloud provider 180 for backup storage on the cloud.

The cloud provider 180 may include public cloud providers such as Amazon Web Services® (AWS), Microsoft Azure®), IBM Cloud, or Google Cloud Platform (GCP). These cloud providers may provide S3 storage under a variety of classes. The storage classes may include Geographical Region based (e.g. US-East-1, US-West-1, AP-East-1 etc.). The storage classes may also include storage class/tiers based on access times, cost, and minimum storage durations. For example, storage class/tiers may be divided into (i) standard/hot tier for more frequently accessed data; (ii) cold tier for less frequently accessed data; (iii) archive tier for almost not accessed data for many months or year; and (iv) deep archive tier for not accessed data for years.

The storage classes may also include intelligent tiers. These tiers, for example, AWS Intelligent Tier that can move data automatically to the next less costly/slow access tier if data are not accessed for certain number of days, e.g., 30 days, 90 days, 180 days, etc. However, these tiers generally require monthly monitoring and auto-tiering costs. These tiers must wait for the waiting period of each next tier in order to move data to the last archival tier. All these tiers come with their own costs and minimum billing durations.

It should be appreciated that the clients 161-162, the backup server 166, and the cloud provider 180 may have access to the network 165 (e.g., a public network), through which they may communicate with each other. Therefore, under the coordination of the backup server 166, the data from the clients 161-162 may be backed up by the backup application 168 in the local storage 179. Then, according to a predefined policy, the backup server 166 may move the data from the local storage 179 to the cloud source storage 186.

Figure 2:
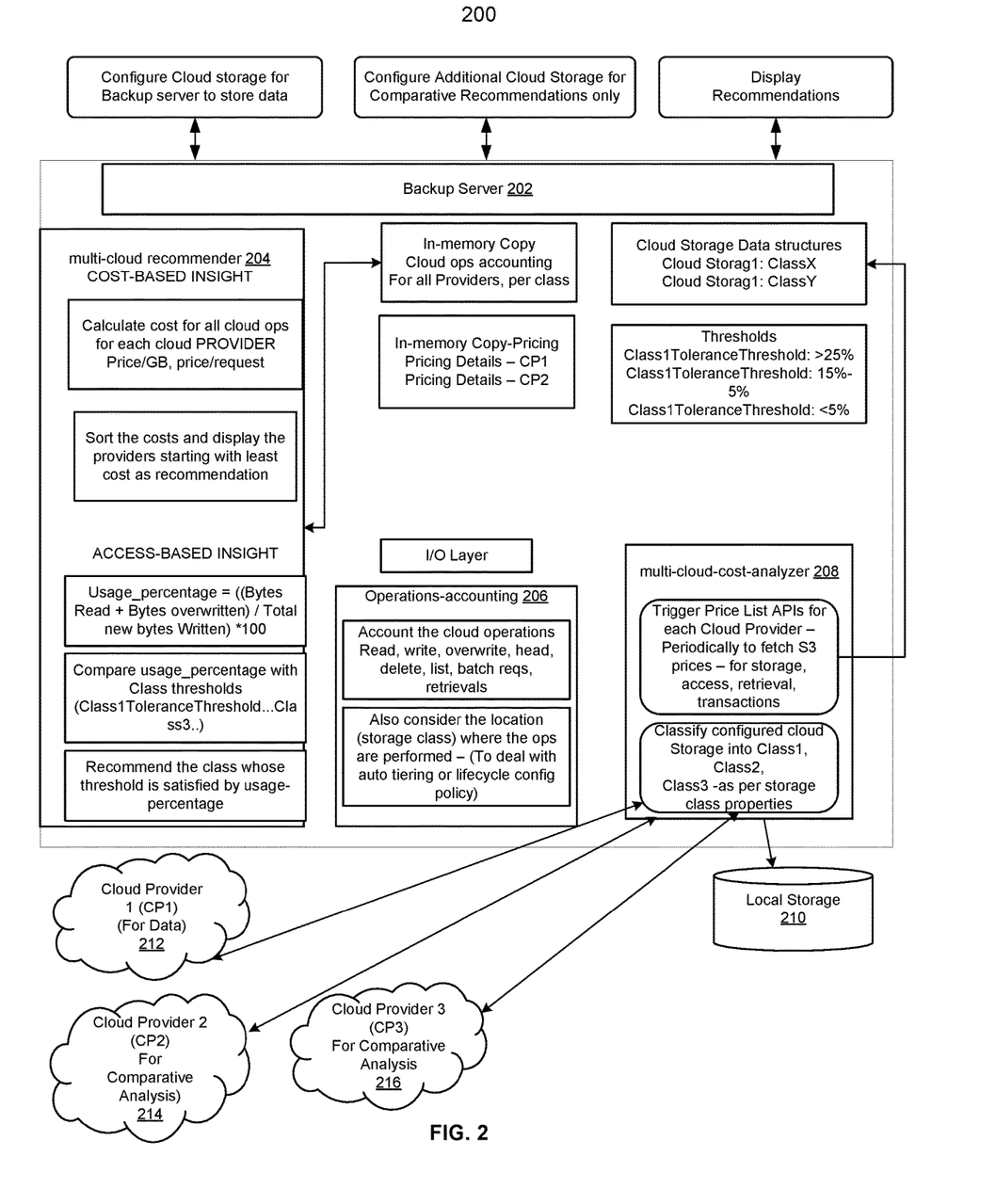
FIG. 2 is a block diagram depicting an example of a backup server according to one embodiment.

FIG. 2 is an example of a system 200 in which a backup server 202 representing the backup server 166 (see FIG. 1B) may be implemented according to one embodiment. This system 200 may provide a recommendation system for a cloud provider and its storage class, based on the accumulated usage pattern in the backup server 202. Two types of recommendations including cost-based insight and access-based insight may be provided by the backup server 202. As shown in FIG. 2, the system 200 includes the backup server 202, local storage 210, cloud provider 1 212, cloud provider 2 214, and cloud provider 3 216. As further illustrated in FIG. 2, the backup server 202 may be communicatively connected to a local storage 210. The local storage 210 may represent local storage 179 in FIG. 1B. The backup server 202 may also be communicatively connected to cloud provider 1 212, cloud provider 2 214, and cloud provider 3 216.

Various methods according to embodiments of the present disclosure may be implemented at the backup server 202. It should be understood that the structure of the system 200 is described for exemplary purposes only, and does not imply any limitation on the scope of the present disclosure. For example, the embodiments of the present disclosure can also be applied to a system different from the system 200. It should be understood that the specific number of various devices is given for illustrative purposes only and does not imply any limitation on the scope of the disclosure. For example, embodiments of the present disclosure may also be applied to more or fewer devices.

Backup server 202 may include multi-cloud recommender 204 that may provide cost-based insight and access-based insight methods. With cost-based insight method, multi-cloud recommender 204 may calculate cost for all cloud operations for each cloud provider (e.g., price/Giga-Bytes (GB), price/request). Multi-cloud recommender 204 may also sort the costs and display the cloud providers starting with least cost as a recommendation. With access-based insight, multi-cloud recommender 204 may calculate usage percentage=((Bytes Read+Bytes overwritten)/Total new bytes Written)*100. Multi-cloud recommender 204 may compare usage percentage with Class thresholds (Class1ToleranceThreshold, . . . , Class3ToleranceThreshold). Multi-cloud recommender 204 may recommend the class which threshold is satisfied by the calculated usage-percentage.

Backup server 202 may also include operations-accounting 206 that may account for the cloud operations (e.g., read, write, overwrite, head, delete, list, batch requests, retrievals). Operations-accounting 206 may also consider the location (storage class) where the operations are performed to deal with auto-tiering or lifecycle configuration policy.

Backup server 202 may further include multi-cloud-cost-analyzer 208. Multi-cloud-cost-analyzer 208 may trigger price list APIs for each cloud provider. Multi-cloud-cost-analyzer 208 may periodically fetch S3 prices for storage, access, retrieval, transactions. Multi-cloud-cost-analyzer 208 may classify configured cloud storage into Class1, Class2, Class3 based on storage class properties.

Figure 3:
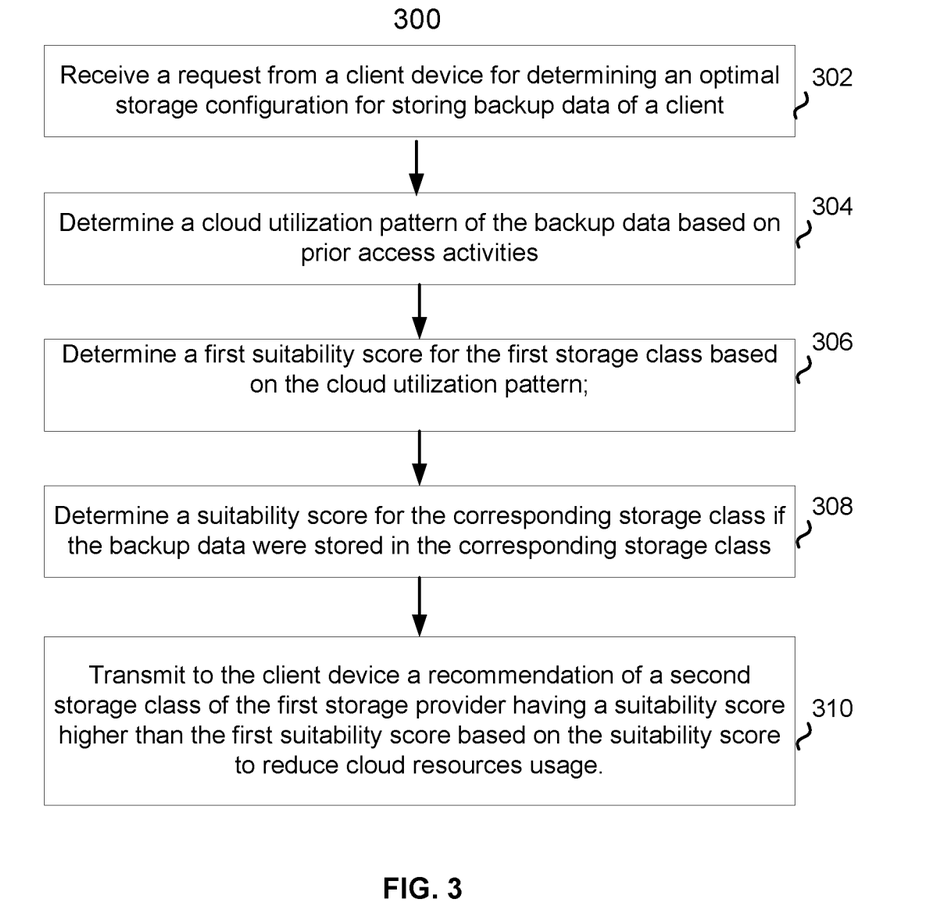
FIG. 3 is a flow diagram illustrating a method for determining an optimal storage configuration of storing backup data according to one embodiment.

FIG. 3 is a flow diagram illustrating method 300 for determining an optimal storage configuration of storing backup data according to one embodiment. For example, method 300 can be performed by a plurality of modules in a backup server 166, which can be implemented in software, firmware, hardware, or any combination thereof. It should be understood that the method 300 may also be performed by other devices, and the scope of the present disclosure is not limited in this regard. It should also be understood that the method 300 may also include additional acts not shown and/or the acts shown may be omitted, and the scope of the present disclosure is not limited in this regard. Method 300 will be described in detail below with reference to FIG. 1B.

Referring now to FIG. 3, at block 302, the backup server 166 may receive a request from a client device for determining an optimal storage configuration for storing backup data of a client. The backup data may be currently stored in a first storage class of a first storage provider that provides a plurality of storage classes of storage.

At block 304, the backup server 166 may determine a cloud utilization pattern of the backup data based on prior access activities.

At block 306, the backup server 166 may determine a first suitability score for the first storage class based on the cloud utilization pattern.

At block 308, the backup server 166, for each of the plurality of the storage classes of the first storage provider, may determine a suitability score for the corresponding storage class if the backup data were stored in the corresponding storage class.

At block 310, the backup server 166 may transmit to the client device a recommendation of a second storage class of the first storage provider having a suitability score higher than the first suitability score based on the suitability score to reduce cloud resources usage.

In one embodiment, the first storage provider may be one of storage providers and each of the storage providers may provide storage classes of storage. The backup server 166, for each of the storage providers and for each of the storage classes of the storage provider, may calculate a suitability score for the corresponding storage class of the corresponding storage provider if the backup data were stored therein. The backup server 166 may rank each combination of the storage classes of the storage providers based on its suitability score. The backup server may transmit to the client device, the ranking of the combinations of the storage classes of the storage providers.

In one embodiment, the backup server 166 may recommend a combination of a storage class of one of the storage providers that has a highest suitability score.

In one embodiment, in determining the first suitability score for the first cloud provider and the first storage class, the backup server 166 may determine the first storage class, compare the first suitability score for the first storage class of the first cloud provider with the suitability score of each of the plurality of the storage classes of the first storage provider, and compare the first suitability score for the first storage class with the suitability score of each of the plurality of the storage classes of the plurality of storage providers.

In one embodiment, in determining the first suitability score for the first cloud provider and the first storage class, the backup server 166 may determine whether the cloud utilization pattern is within a predetermined range of the first suitability score of the first storage class. The backup server 166 may also identify the plurality of storage classes including the first and second storage classes based on how frequently backup data are accessed or modified. The plurality of storage classes may include frequently accessed class, infrequently accessed class, and archival class. The backup server 166 may determine an amount of backup data access or modification performed over time by a backup server and store the plurality of storage classes in a local storage.

In one embodiment, the backup server 166 may update accounting statistics for a cloud operation in a data structure and store the accounting statistics for the performed cloud operations for each of the plurality of storage classes and each of the plurality of the cloud providers.

In one embodiment, the backup server 166 may fetch a plurality of metrics of a plurality of cloud operations, calculate total costs for the plurality of cloud operations based on the plurality of metrics of cloud operations, record the total costs in a data structure on a local storage, sort the data structure using a predefined sorting algorithm, and display the data structure. A top row of the data structure may indicate the suitable cloud provider and storage class for the optimal storage configuration for storing backup data.

In one embodiment, the backup server 166 may fetch an amount associated with operations performed in a configured storage class, calculate a utilization percentage based on the amount associated with the operations performed in the configured storage class, and compare the utilization percentage with a plurality of storage class thresholds for each storage class.

In one embodiment, the backup server 166 may determine whether the utilization percentage satisfies one of the plurality of storage classes to which the configured storage class belongs to, recommend the suitable storage class, and display the suitable storage class and a mapping of the suitable storage class for each of the plurality of storage providers corresponding to the suitable storage class.

Figure 4:
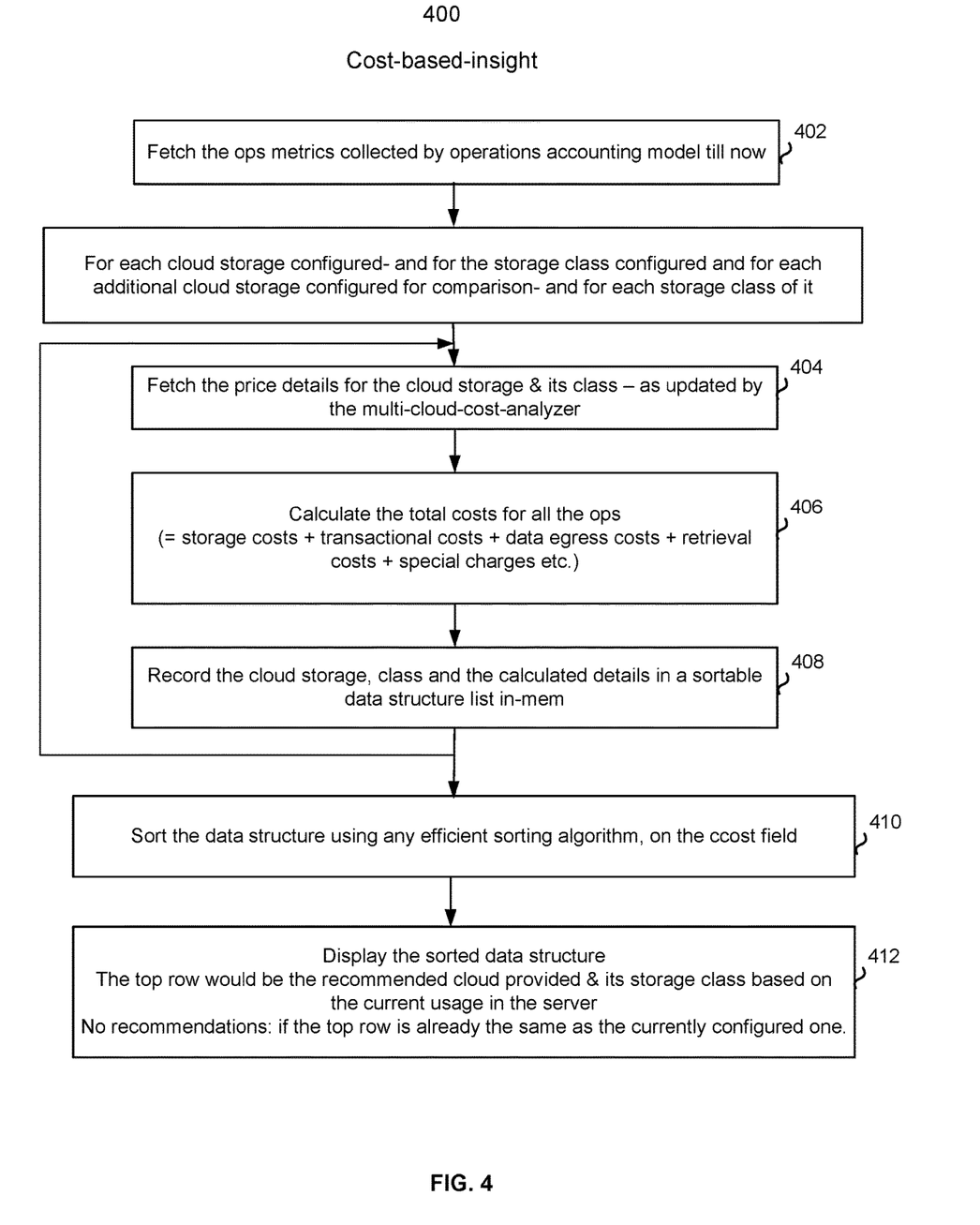
FIG. 4 is a flow diagram illustrating a cost-based insight method according to one embodiment.

FIG. 4 is a flow diagram illustrating cost-based insight method 400 that can be performed by multi-cloud-cost-analyzer 174 according to one embodiment. Method 400 will now be discussed in details with reference to FIG. 1B. Cost-based-insight method 400 may allow a storage class to be selected and compared with other storage classes within the same storage provider. Moreover, the selected storage class and other storage classes within the same storage provider may be compared with other cloud providers and their classes. The accumulated cost of the usage pattern may be compared with other storage classes within the same cloud provider to recommend an optimal storage class which may be cheaper than the one being currently used. Similarly, the accumulated cost of the usage pattern may be compared with other storage classes of other cloud providers to recommend an optimal storage class which may be cheaper than the one being currently used.

In operation 402, cloud operation statistics may be fetched. The cloud operation statistics may be collected by the "operations-accounting" module 176 for a cloud storage. In operation 404, the cloud storage price details collected by the "multi-cloud-cost-analyzer" may be fetched. In operation 406, price per GB and price per request may be calculated for all the accumulated cloud operation types in the cloud storage. Note that cloud providers may charge for amount of data as well as for number of requests. Moreover, special charges such as batch operation may be calculated. For each different storage class supported by the provider, similar costs may be calculated based on the applicable slabs for all the accumulated cloud operation types in that cloud storage. In this manner, the predicted cost for the recommended class may be determined.

Similarly, comparable costs for all storage classes for the remaining configured cloud providers may also be calculated. In operation 408, the cost analysis details of each cloud provider and each class may be stored in sortable data structures (e.g., a list) in-memory. In operation 410, the data structure may be sorted based on the cost field using sorting algorithms. In operation 412, the sorted data structure (e.g., table) may be displayed. The first row of the data structure may indicate the lowest cost and may be marked as recommended. Note that the table may have more than one row having the same cost. All of rows having the same cost may be marked as recommended. If the currently configured cloud storage and its class reside in the first row, no recommendations may be provided because the optimal cloud storage is currently used.

Figure 5:
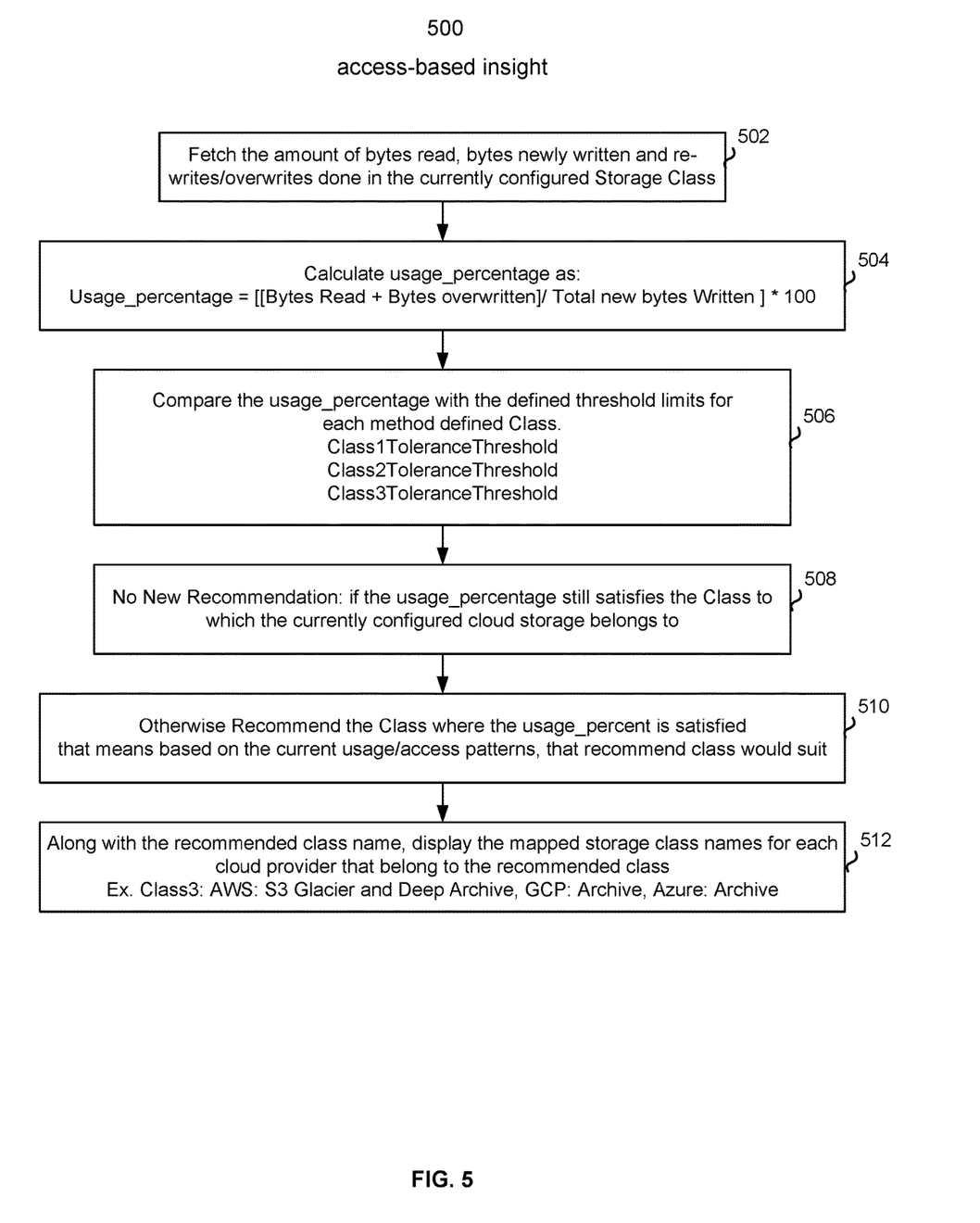
FIG. 5 is a flow diagram illustrating an access-based insight method according to one embodiment.

FIG. 5 is a flow diagram illustrating access-based insight method 500 that can be performed by multi-cloud-cost-analyzer 174 according to one embodiment. Method 500 will now be discussed with reference to FIG. 1B. Access-based-insight method 500 may allow a storage class to be selected and determined if the usage or access patterns are suitable for the selected storage class or some other storage classes. The configured cloud storage class can be identified as Class1, Class2, or Class3. The classes may be identified based on how frequent data are accessed or modified. In this method, the amount of data access or modifications performed over time by the backup server may be determined. A new class may be recommended if the usage patterns are determined to be more suitable to the new class.

In operation 502, amount of bytes (read, newly written and re-writes/overwrites) in the currently configured storage class may be fetched. In operation 504, the usage percentage may be calculated according to usage percentage=((Bytes read+Bytes overwritten)/Total new bytes written)*100.

In operation 506, the usage percentage may be compared with the defined threshold limits for each class (e.g., Class1, Class2, Class3). In operation 508, if the usage percentage satisfies the threshold of the class to which the currently configured cloud storage belongs to, "no new recommendation" may be indicated. In operation 510, if the usage percentage violates the above threshold, the usage percentage may be compared with the thresholds of the remaining classes (Class1ToleranceThreshold, Class2ToleranceThreshold, Class3ToleranceThreshold). The recommended class refers to the class in which the usage percentage is satisfied. For example, if the currently configured class is "Class1" and the usage percentage is calculated to be 3%, then "Class3" may be recommended because the usage_percentage satisfies the Class3ToleranceThreshold. In another example, the current configured class is "Class3". If 100 GB is written to cloud storage, 25 GB is read and 10 GB overwritten, the calculated usage_percentage is 35%. Class1 may be recommended because 35% satisfies the "Class1ToleranceThreshold". Therefore, Class3 (Archival/Staging class) may not be suitable for the current configured class.

The storage classes/tier names of each cloud provider mapped to each class may be determined. In operation 512, the storage class names for each cloud provider may be displayed. More than three storage classes may be defined depending on the cloud providers and the granularity the backups server requires. The number of thresholds may be configured according to the number of storage classes resulting in one threshold for each class.

Figure 6:
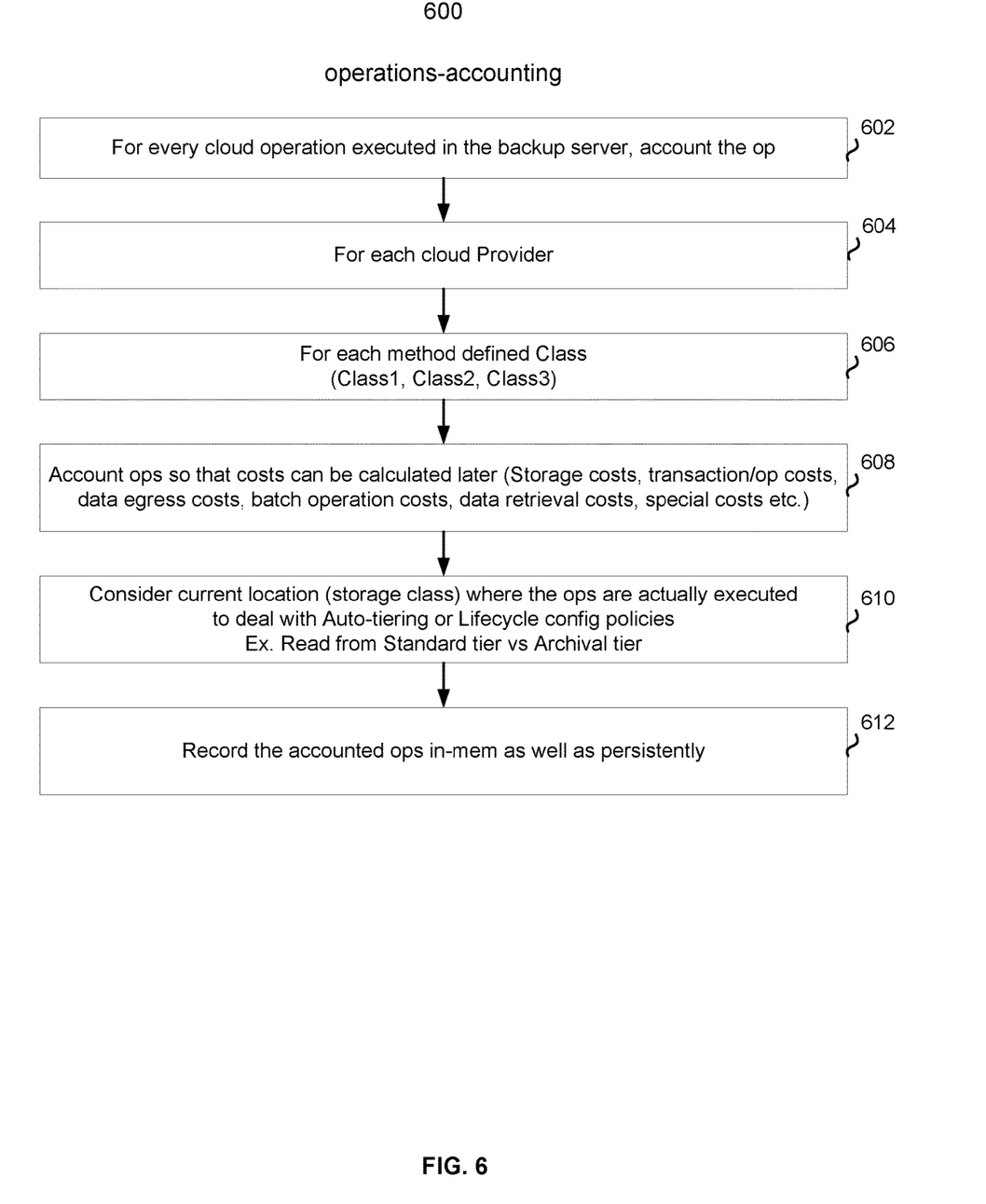
FIG. 6 is a flow diagram illustrating a method implemented by operations-accounting module according to one embodiment.

FIG. 6 is a flow diagram illustrating method 600 that can be performed by multi-operations-accounting module 176 according to one embodiment. An operations-accounting module 176 may be implemented in the backup server 166. In operation 602, each cloud operation that is performed in the system may be accounted by the operations-accounting module 176. The operations-accounting module 176 may update the accounting statistics for the cloud operations in appropriate data structures in the system. In operation 604, the accounting statistics for the cloud operations may be categorized for each cloud provider configured in the backup server. In operation 606, the accounting statistics for the cloud operations may be sub-categorized for each method defined storage class (Class1, Class2, Class3). In operation 608, cloud costs can be calculated and costs may be a combination of various costs, including storage costs, transaction/operational costs, data egress costs, batch operation costs, etc. The operations-accounting module may store the metrics for the performed operations (the bytes and number of operations/requests for each operation, etc.).

Below are the examples of the metrics.
Read requests No. of GET, Total bytes Read (Retrievals)
Write requests No. of PUT, Total bytes Written (Ingests)
Overwrite requests No. of PUT, Total bytes Over-Written (Ingests) On existing objects
Head requests No. of HEAD requests
Delete requests No. of DELETE requests
List requests No. of requests
Batch requests Providers charge per job and per million operations
Retrieval requests No. of request where data was read from archival type of class (Extra cost for such operations).

In operation 610, the above described metrics may be accounted based on a current location (i.e., the storage class on which the operation is performed (Class1, Class2 or Class3)). For every cloud provider configured in the backup server, there may be three sets of accounting metrics (one for each class). Scenarios such as auto-tiering or lifecycle policy based movement of data to other storage classes/tiers after certain number of days may be considered. The cost or pricing may be different from the time the data were written. In operation 612, these accounting statistics may be stored in in-memory and persistent memory and cumulatively updated over time.

The usage pattern of the backup server can be tracked using these accounting statistics. For example, data can be moved to archival storage class and be accessed within a month. The data can also be moved to standard class and not be accessed or modified for six months. Appropriate cloud provider APIs can be used for detecting the current location of any object.

Command-line-interface (CLI) or a graphical-user-interface (GUI) functionality such as multi-cloud-recommender 170 may be implemented in the backup server. Multi-cloud-recommender 170 may determine the accumulated access pattern and provide the cost-based-insights and access-based-insights, as well as recommendations for a particular cloud storage.

Figure 7:
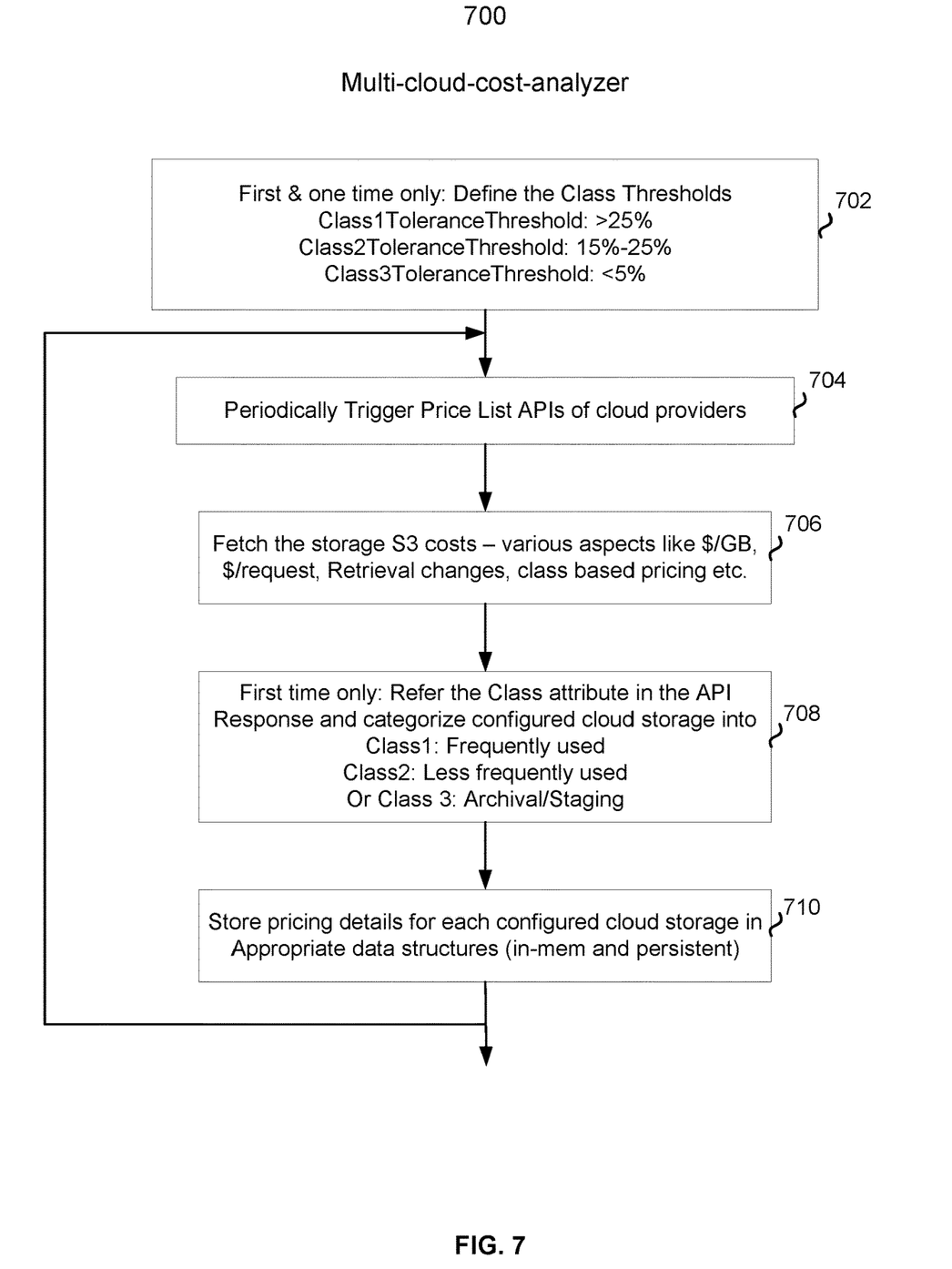
FIG. 7 is a flow diagram illustrating a method implemented by multi-cloud-cost analyzer according to one embodiment.

FIG. 7 is a flow diagram illustrating method 700 that can be performed by multi-cloud-cost-analyzer 174 according to one embodiment. Method 700 will now be discussed with reference to FIG. 1B. Multi-cloud-cost-analyzer 174 may be implemented in the backup server 166. Each cloud provider may publish a pricing catalogue in various forms, including REpresentational State Transfer (REST) Application Programming Interfaces (APIs). REST APIs examples may include, but is not limited to, AWS Price List Service API, GCP Cloud Billing Catalog API, or Azure Retail Rates Prices API.

In operation 702, three thresholds may be defined in the backup server for the above described class label. These thresholds may be defined based on percentages of data access/modifications/overwrites that can be tolerated for each class of the cloud storage. For example, >25% may define the total amount of reads or modifications performed is more than 25% of the total data written to the cloud storage, at any point in time. The <5% may define the total amount of reads or modifications performed is less than 5% of the total data written to the cloud storage. Class1 may include frequently accessed storage classes and the percentage of access and modification may be generally high. Whereas, Class3 may have a low percentage because class3 may include archival or staging storage classes in which data access or modification is not expected for months or years. Note the data access or modification are related to the operations of the existing cloud data only and not on newly written cloud data.

The three thresholds may include Class1ToleranceThreshold: >25% Class2ToleranceThreshold: 15%-25%, and Class3ToleranceThreshold: <5%. The values of the thresholds can be configured in the backup server allowing the admins to define their own tolerance levels.

In operation 704, multi-cloud-cost-analyzer 174 may periodically (e.g., configurable in number of days) trigger these APIs for each configured cloud storage provider in the backup server. In operation 706, multi-cloud-cost-analyzer 174 may fetch the pricing/cost details of S3 storage. For example, the pricing/cost details may include $price/GigaBytes (GB) in different slabs (e.g., <100 GB, 100-500 GB, 500-1 TeraBytes (TB), etc.), different classes including hot or cold storage, archival, standard storage etc., as applicable to the provider. The cloud providers may occasionally modify the price catalogue. Therefore, the configurable number of days can be configured as once or twice in a month. This configuration may be performed for each cloud provider configured in the backup server, including the additional cloud providers configured for comparison purposes.

Initially, in operation 708, the currently configured active cloud storage may be determined and mapped into one of the three class labels based on the storage class properties. Class1 may include hot, frequently accessed, or standard classes. For example, AWS: S3 Standard class, GCP: Standard Storage, Azure: Hot tier. Class2 may include infrequently accessed or cold classes. For example, AWS: S3 Standard-IA, GCP: Nearline and Coldline Storage, Azure: Cool tier. Class3 may include archival or staging classes. For example, AWS: S3 Glacier and Deep Archive, GCP: Archive, Azure: Archive.

The determination and the mapping may be performed by referring to the "storageClass" or "resourceGroup" or similar keys/fields in the Price List/Catalogue APIs response. For example, AWS may specify the classes using "StorageClass" key in the API response (e.g., General Purpose, Infrequent Access, Archive, Staging). GCP may specify the classes using "resourceGroup" key in the API response (e.g., RegionalStorage, NearlineStorage, ColdlineStorage, ArchiveStorage). The class labels may be stored existing data structures for each cloud storage configured in the backup server. The data structure may be stored in-memory database or persistent memory. A newly configured cloud storage may be mapped during the configuration.

In operation 710, the pricing data may be stored locally to avoid constantly accessing the cloud provider. The pricing data may be stored locally in appropriate data structures in each cloud provider. The data structure may be stored in-memory database or persistent memory. The data structure may be overwritten during subsequent updates.

The method described herein may configure other different cloud providers for a cross-cloud comparative analysis in the backup server. For example, if AWS is configured in the backup system for data, then users can additionally configure GCP and Azure for comparison-based recommendation purposes.

The method described herein also may require additional user credentials to be provided for each cloud provider to be included in the comparative analysis. A working cloud account with the cloud provider is also required. Input methods, including a command-line-interface (CLI) or a graphical-user-interface (GUI) may be implemented in the backup server to accept and store these additional user credentials for each cloud provider.

The method can also be provided with the pricing information that can be obtained manually, in a form of a JavaScript Object Notation (JSON), Extensible Markup Language (XML), or text etc. The user may be responsible for the accuracy and the updated version of the price. Scripts or parsers may be used to scan pricing webpages of cloud providers in order to fetch the price details for S3 storage.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, or flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods described above are in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining an optimal storage configuration of storing backup data, the method comprising:
receiving a request from a client device for determining an optimal storage configuration for storing backup data of a client, wherein the backup data is currently stored in a first storage class of a first storage provider that provides a plurality of storage classes of storage;
determining a cloud utilization pattern of the backup data based on prior access activities;
determining a current suitability score for the first storage class based on the cloud utilization pattern;
for each of the plurality of the storage classes of the first storage provider, determining a potential suitability score for a corresponding storage class if the backup data were stored in the corresponding storage class; and
transmitting to the client device a recommendation of a second storage class of the first storage provider having a corresponding potential suitability score higher than the first current suitability score.

2. The method of claim 1, wherein the first storage provider is one of a plurality of storage providers and each of the storage providers provides a plurality of storage classes of storage, wherein the method further comprises:
for each of the storage providers and for each of the storage classes of the storage provider, calculating a potential suitability score for the corresponding storage class of the corresponding storage provider if the backup data were stored therein;
ranking each combination of the storage classes of the storage providers based on corresponding potential suitability scores for each combination; and
transmitting to the client device, the ranking of the combinations of the storage classes of the storage providers.

3. The method of claim 2, further comprising recommending a combination of a storage class of one of the storage providers that has a highest suitability score.

4. The method of claim 2, wherein determining the first current suitability score for the storage class comprises:
determining the first storage class;
comparing the current suitability score for the first storage class of the first cloud storage provider with the potential suitability score of each of the plurality of the storage classes of the first storage provider; and
comparing the current suitability score for the first storage class with the potential suitability score of each of the plurality of the storage classes of the plurality of storage providers.

5. The method of claim 1, wherein determining the first current suitability score for the first storage provider and the first storage class comprises:
determining whether the cloud utilization pattern is within a predetermined range of the current suitability score of the first storage class;
identifying a type for each of the plurality of storage classes based on how frequently backup data are accessed or modified, wherein the types for the plurality of storage classes include a frequently accessed class, an infrequently accessed class, and an archival class;
determining an amount of backup data access performed over time by a backup server; and
storing the types for each of the plurality of storage classes in a local storage.

6. The method of claim 5, further comprising:
updating accounting statistics for a cloud operation in a data structure for each of the plurality of storage classes and each of the plurality of the storage providers; and
storing the accounting statistics for the cloud operation for each of the plurality of storage classes and each of the plurality of the storage providers.

7. The method of claim 2, further comprising:
fetching a plurality of metrics of a plurality of cloud operations;
calculating total costs for the plurality of cloud operations based on the plurality of metrics of cloud operations;
recording the total costs in a data structure on a local storage;
sorting the data structure using a predefined sorting algorithm; and
displaying the data structure, wherein a top row of the data structure indicates the optimal storage provider and storage class for the optimal storage configuration of storing backup data.

8. The method of claim 2, further comprising:
fetching an amount associated with operations performed in a configured storage class;
calculating a utilization percentage based on the amount associated with the operations performed in the configured storage class; and
comparing the utilization percentage with a plurality of storage class thresholds for each storage class.

9. The method of claim 8, further comprising:
  determining the utilization percentage satisfies one of the plurality of storage classes to which the configured storage class belongs to;
  identifying the one of the plurality of storage classes as a suitable storage class;
  recommending the suitable storage class; and
  displaying the suitable storage class and a mapping of the suitable storage class for each of the plurality of storage providers corresponding to the suitable storage class.

10. A non-transitory machine-readable medium having instructions stored therein, which when executed by a processor, cause the processor to perform operations of determining an optimal storage configuration of storing backup data, the operations comprising:
  receiving a request from a client device for determining an optimal storage configuration for storing backup data of a client, wherein the backup data is currently stored in a first storage class of a first storage provider that provides a plurality of storage classes of storage;
  determining a cloud utilization pattern of the backup data based on prior access activities;
  determining a current suitability score for the first storage class based on the cloud utilization pattern;
  for each of the plurality of the storage classes of the first storage provider, determining a potential suitability score for a corresponding storage class if the backup data were stored in the corresponding storage class; and
  transmitting to the client device a recommendation of a second storage class of the first storage provider having a corresponding potential suitability score higher than the first current suitability score.

11. The machine-readable medium of claim 10, wherein the first storage provider is one of a plurality of storage providers and each of the storage providers provides a plurality of storage classes of storage, wherein the operations further comprise:
  for each of the storage providers and for each of the storage classes of the storage provider, calculating a potential suitability score for the corresponding storage class of the corresponding storage provider if the backup data were stored therein;
  ranking each combination of the storage classes of the storage providers based on corresponding potential suitability scores for each combination; and
  transmitting to the client device, the ranking of the combinations of the storage classes of the storage providers.

12. The machine-readable medium of claim 10, wherein the operations further comprise recommending a combination of a storage class of one of the storage providers that has a highest suitability score.

13. The machine-readable medium of claim 11, wherein determining the current suitability score for the first storage class comprises:
  determining the first storage class;
  comparing the current suitability score for the first storage class of the first storage provider with the potential suitability score of each of the plurality of the storage classes of the first storage provider; and
  comparing the current suitability score for the first storage class with the potential suitability score of each of the plurality of the storage classes of the plurality of storage providers.

14. The machine-readable medium of claim 10, wherein determining the current suitability score for the first storage provider and the first storage class comprises:
  determining whether the cloud utilization pattern is within a predetermined range of the current suitability score of the first storage class;
  identifying a type for each of the plurality of storage classes based on how frequently backup data are accessed or modified, wherein the types for the plurality of storage classes include a frequently accessed class, an infrequently accessed class, and an archival class;
  determining an amount of backup data access performed over time by a backup server; and
  storing the types for each of the plurality of storage classes in a local storage.

15. The method machine-readable medium of claim 14, wherein the operations further comprise:
  updating accounting statistics for a cloud operation in a data structure for each of the plurality of storage classes and each of the plurality of the storage providers; and
  storing the accounting statistics for the cloud operation for each of the plurality of storage classes and each of the plurality of the storage providers.

16. A data processing system, comprising:
  a processor; and
  a memory to store instructions, which when executed by the processor, cause the processor to perform operations of determining an optimal storage configuration of storing backup data, the operations including:
  receiving a request from a client device for determining an optimal storage configuration for storing backup data of a client, wherein the backup data is currently stored in a first storage class of a first storage provider that provides a plurality of storage classes of storage;
  determining a cloud utilization pattern of the backup data based on prior access activities;
  determining a current suitability score for the first storage class based on the cloud utilization pattern;
  for each of the plurality of the storage classes of the first storage provider, determining a potential suitability score for a corresponding storage class if the backup data were stored in the corresponding storage class; and
  transmitting to the client device a recommendation of a second storage class of the first storage provider having a corresponding potential suitability score higher than the first current suitability score.

17. The data processing system of claim 16, wherein the first storage provider is one of a plurality of storage providers and each of the storage providers provides a plurality of storage classes of storage, wherein the operations further comprise:
  for each of the storage providers and for each of the storage classes of the storage provider, calculating a potential suitability score for the corresponding storage class of the corresponding storage provider if the backup data were stored therein;
  ranking each combination of the storage classes of the storage providers based on corresponding potential suitability scores for each combination; and
  transmitting to the client device, the ranking of the combinations of the storage classes of the storage providers.

18. The data processing system of claim 16, wherein the operations further comprise recommending a combination of a storage class of one of the storage providers that has a highest suitability score.

19. The data processing system of claim 17, wherein determining the first current suitability score for the first storage class comprises:

determining the first storage class;

comparing the current suitability score for the first storage class of the first cloud storage provider with the potential suitability score of each of the plurality of the storage classes of the first storage provider; and comparing the current suitability score for the first storage class with the potential suitability score of each of the plurality of the storage classes of the plurality of storage providers.

20. The data processing system of claim 17, wherein determining the current suitability score for the first storage provider and the first storage class comprises:

determining whether the cloud utilization pattern is within a predetermined range of the current suitability score of the first storage class;

identifying a type for each of the plurality of storage classes based on how frequently backup data are accessed or modified, wherein the types for the plurality of storage classes include a frequently accessed class, an infrequently accessed class, and an archival class;

determining an amount of backup data access performed over time by a backup server; and storing the types for each of the plurality of storage classes in a local storage.

* * * * *

UNITED STATES PATENT AND TRADEMARK OFFICE
CERTIFICATE OF CORRECTION

| | | |
|---|---|---|
| PATENT NO. | : 11,693,580 B2 | Page 1 of 1 |
| APPLICATION NO. | : 17/337975 | |
| DATED | : July 4, 2023 | |
| INVENTOR(S) | : Jagannathdas Rath and Kalyan C Gunda | |

It is certified that error appears in the above-identified patent and that said Letters Patent is hereby corrected as shown below:

In the Claims

In Claim 1, Column 15, Line 58, delete "the first current" and insert --the current--.

In Claim 4, Column 16, Line 10, delete "determining the first" and insert --determining the--.

In Claim 4, Column 16, Line 11, delete "the storage class" and insert --the first storage class--.

In Claim 4, Column 16, Line 14, delete "the first cloud storage" and insert --the first storage--.

In Claim 5, Column 16, Line 22, delete "determining the first" and insert --determining the--.

In Claim 10, Column 17, Line 32, delete "the first current" and insert --the current--.

In Claim 15, Column 18, Line 14, delete "The method machine-readable" and insert --The machine-readable--.

In Claim 16, Column 18, Line 44, delete "the first current" and insert --the current--.

In Claim 19, Column 18, Line 66, delete "determining the first current" and insert --determining the current--.

In Claim 19, Column 19, Line 3, delete "first cloud storage" and insert --first storage--.

Signed and Sealed this
Fifteenth Day of April, 2025

Coke Morgan Stewart
*Acting Director of the United States Patent and Trademark Office*